(No Model.)
C. G. KLEINNECK.
CAR COUPLING.
No. 512,717. Patented Jan. 16, 1894.
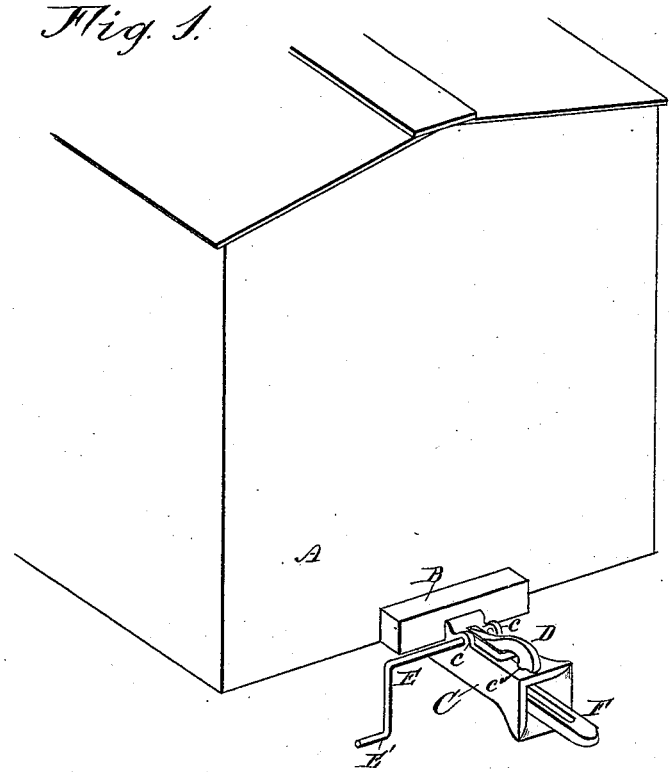
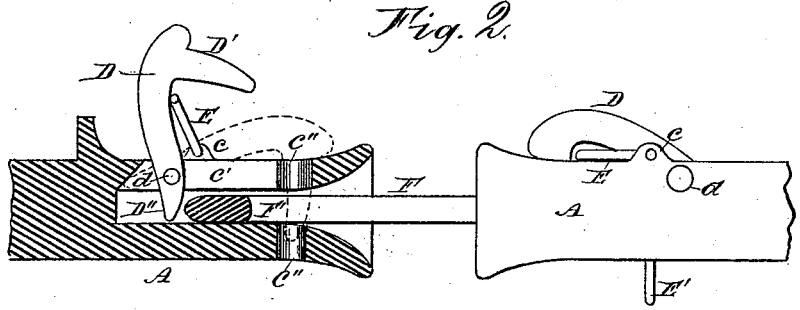

UNITED STATES PATENT OFFICE.

CHARLES G. KLEINNECK, OF MOUNT VERNON, IOWA.

CAR-COUPLING.

SPECIFICATION forming part of Letters Patent No. 512,717, dated January 16, 1894.

Application filed April 20, 1893. Serial No. 471,071. (No model.)

*To all whom it may concern:*

Be it known that I, CHARLES G. KLEINNECK, a citizen of the United States, residing at Mount Vernon, in the county of Linn and State of Iowa, have invented certain new and useful Improvements in Car-Couplers; and I do hereby declare the following to be a full, clear, and exact description of the invention, such as will enable others skilled in the art to which it appertains to make and use the same.

The object of this invention is to produce a car-coupler using a link, which will couple automatically; and the invention consists in the construction, combination and arrangement of parts, as hereinafter fully set forth and claimed.

In the accompanying drawings, forming a part of this specification, Figure 1 is a view of a coupler embodying my invention in perspective, as applied to a car. Fig. 2 is a side elevation, partly in section, of two draw-heads, showing the manner of constructing and operating them.

Similar letters of reference indicate corresponding parts.

Referring to the drawings, A represents an ordinary freight car, provided with the usual "dead-wood" B. Under this is attached in the ordinary way, a draw-head C, which in its general appearance does not differ widely from those in common use. In the adaptation of the drawhead to the ends aimed at in this invention, however, certain peculiar features of construction are necessary, which will now be described. The throat of the draw-head, as shown in Fig. 2, is preferably closed at the back end, that is to say, just back of the dog D, to afford an abutting bearing for the link F so that it is readily forced into the throat of the other draw-head and automatically coupled thereto. In a slot $c'$ in the upper part of the draw-head is hinged at $d$ a dog D, having a hook D' at the forward end, to engage with the link F, and a tail-piece D'' to throw the dog forward and down by the impact of the end of the link therewith. Under this dog is placed the cranked portion of a rock-shaft E, having bearings at $c\ c$, and provided with a handle E at its outer end, by which it is operated. By turning this handle upward the dog is disengaged from the link, as illustrated in Fig. 2. The hook portion D' of the dog passes down through a hole $c''$ at the forward end of the slot $c'$ in the draw-head. This hole is somewhat wider than the slot, as shown in Fig. 1, and corresponds in size to that in the ordinary draw-head of this type, so that it may be used for the common pin in connection with the ordinary link, in case it should ever be necessary so to do. The slot being somewhat narrower than the hole, prevents the pin from tipping back in the act of coupling. The forward side of the hole affords a double bearing for the forward face of the hook D'. The link F is preferably made with quite a long solid part F' at each end, so that the lost motion in taking up the "slack" after coupling is not so much as it would be if the link were made like the common one.

As will be readily seen, the construction is such that the coupling is performed automatically, and without the necessity of going between the cars. The uncoupling of the cars, also, is performed without danger to the operator.

Having thus described my invention, I claim—

In a car-coupler, the combination of the draw-head C, having the slot $c'$ with the hole $c''$ somewhat wider than the slot, which forms a double bearing for the dog the dog D D' having tail-piece D'', and pivoted at $d$ in said slot, the crank-shaft E E' pivoted at $c\ c$, and the link F, substantially as and for the purpose set forth.

In testimony whereof I affix my signature in presence of two witnesses.

CHARLES G. KLEINNECK.

Witnesses:
W. M. SMITH,
E. T. GOUGH.